US007440747B2

(12) United States Patent
Takaki et al.

(10) Patent No.: US 7,440,747 B2
(45) Date of Patent: Oct. 21, 2008

(54) COMMUNICATION TERMINAL, COMMUNICATION METHOD, AND PROGRAM

(75) Inventors: Taku Takaki, Fujisawa (JP); Makato Katagishi, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 895 days.

(21) Appl. No.: 10/782,629

(22) Filed: Feb. 18, 2004

(65) Prior Publication Data
US 2004/0174857 A1  Sep. 9, 2004

(30) Foreign Application Priority Data
Mar. 4, 2003  (JP)  ............. 2003-056514

(51) Int. Cl.
*H04Q 7/22* (2006.01)
*H04Q 7/20* (2006.01)
(52) U.S. Cl. .............. 455/412.2; 455/414.2; 455/456.1; 455/456.3
(58) Field of Classification Search .............. 455/456.1, 455/456.3, 412.2, 414.2
See application file for complete search history.

(56) References Cited

U.S. PATENT DOCUMENTS

| 6,263,209 | B1 * | 7/2001 | Reed et al. ............... 455/456.3 |
| 6,674,483 | B2 * | 1/2004 | Takeda et al. ............... 348/553 |
| 6,898,569 | B1 * | 5/2005 | Bansal et al. ................. 705/9 |
| 6,999,731 | B2 * | 2/2006 | Cronin ........................ 455/88 |

| 2001/0014145 | A1 * | 8/2001 | Kamel et al. ............. 379/88.19 |
| 2003/0108156 | A1 * | 6/2003 | Komaki et al. ............. 379/67.1 |
| 2004/0154461 | A1 * | 8/2004 | Havukainen et al. .......... 84/645 |

FOREIGN PATENT DOCUMENTS

| JP | 07-030622 | 1/1995 |
| JP | 08-181758 | 7/1996 |
| JP | 10-124464 | 5/1998 |
| JP | 2002-152334 A | 5/2002 |

\* cited by examiner

*Primary Examiner*—Barry W Taylor
(74) *Attorney, Agent, or Firm*—Townsend and Townsend and Crew LLP

(57) ABSTRACT

Embodiments of the invention provide communication devices and methods with improved usability. In one embodiment, a communication device comprises a storage unit configured to store an input time, a transmission destination, and a first message; a clock function unit configured to reference a current time; an input unit configured to receive input from a user; a notification unit configured to provide notification to the user; and a transmission unit configured to transmit the first message stored in the storage unit to the transmission destination. A control unit is configured to control the notification unit to provide notification to the user when the input time stored in the storage unit matches the current time indicated by the clock function unit, to control the transmission unit to transmit the first message when no input indicating transmission cancellation is provided through the input unit within a predetermined length of time from the notification, and to control the transmission unit to not transmit the first message when input indicating transmission cancellation is provided through the input unit within the predetermined length of time from the notification.

13 Claims, 13 Drawing Sheets

FIG.5

| RECORD | MEMORY SAVE/CALL-UP |

DESTINATION: yoshiko@abc-xyz.co.jp

TITLE: MEETING EXTENDED

MAIN TEXT:

《AUTOMATIC TRANSMISSION》

THE MEETING HAS BEEN EXTENDED
CAN YOU DO THE XXX TRADING JOB?
I'LL CONTACT YOU AS SOON AS
I'M FINISHED

FIG.6

| RECORD | MEMORY SAVE/ CALL-UP |

DESTINATION: yoshiko@abc-xyz.co.jp

TITLE: FINISHED

MAIN TEXT:

《AUTOMATIC TRANSMISSION》

THE MEETING IS FINISHED, DELAYED BY "$DELAY"

```
┌─────────────────────────────────────┐
│         SCHEDULE REGISTER           │
│  ─────────────────────────────────  │
│                                     │
│   TITLE:  ┌──────────────────────┐  │
│           │ REGULAR MEETING      │  │
│           └──────────────────────┘  │
│                                     │
│   DATE:   ┌──────────────────────┐  │
│           │ 04/04/03             │  │
│           └──────────────────────┘  │
│                                     │
│   START: ┌──────┐   END: ┌──────┐   │
│          │ 1630 │        │ 1730 │   │
│          └──────┘        └──────┘   │
│                                     │
│   NOTE:  ┌──────────────────────┐   │
│          │ MEETING ROOM 3       │   │
│          │                      │   │
│          │                      │   │
│          └──────────────────────┘   │
│                                     │
│   ┌──────────────┐      ⊘    ✉     │
│   │  FUNCTION    │                  │
│   └──────────────┘                  │
└─────────────────────────────────────┘
```

COMMUNICATION TERMINAL, COMMUNICATION METHOD, AND PROGRAM

CROSS-REFERENCES TO RELATED APPLICATIONS

This application relates to and claims priority from Japanese Patent Application No. 2003-056514, filed on Mar. 4, 2003, the entire disclosure of which is incorporated herein by reference.

BACKGROUND OF THE INVENTION

1. Field of the Invention

The present invention relates to a communication terminal, a communication method, and a program for transmitting information.

2. Description of the Related Art

An information processing device and a message transmission method enabling automatic communication based on the content of a schedule and the current situation have been proposed in the past (see, e.g., Japanese Unexamined Patent Application Publication H10-124464, Paragraph 0008).

In this publication, a determination is made as to whether or not the distance between the current position and a scheduled location is equal to or greater than a preset distance (Japanese Unexamined Patent Application Publication H10-124464, Paragraph 0039, B10 in FIG. 4), and if the distance is equal to or greater than the set distance, the amount of time required to reach the scheduled location from the current position is determined. A determination is then made as to whether it will be possible to meet the scheduled time, and if not, a message is transmitted (Japanese Unexamined Patent Application Publication H10-124464, Paragraph 0040, B13 in FIG. 4). At the same time, a message containing the length of the delay is transmitted (Japanese Unexamined Patent Application Publication H10-124464, Paragraph 0090, FIG. 10). However, when a message is to be transmitted, the current position must be detected, and when the set distance is short, the time required to reach the scheduled location from the current position must be determined frequently, and thus the processing load on the communication terminal is large. If the set distance is long, on the other hand, no message is transmitted even if in actuality a delay is going to occur, and thus there is room for further improvement from the point of view of usability.

BRIEF SUMMARY OF THE INVENTION

Embodiments of the present invention provide a communication device which solves the aforementioned problems and features and improves usability.

In accordance with an aspect of the present invention, a communication device comprises a storage unit configured to store an input time, a transmission destination, and a first message; a clock function unit configured to reference a current time; an input unit configured to receive input from a user; a notification unit configured to provide notification to the user; and a transmission unit configured to transmit the first message stored in the storage unit to the transmission destination. A control unit is configured to control the notification unit to provide notification to the user when the input time stored in the storage unit matches the current time indicated by the clock function unit, to control the transmission unit to transmit the first message when no input indicating transmission cancellation is provided through the input unit within a predetermined length of time from the notification, and to control the transmission unit to not transmit the first message when input indicating transmission cancellation is provided through the input unit within the predetermined length of time from the notification.

In accordance with another aspect of the invention, a communication device comprises a storage unit configured to store an input time, a transmission destination, a first transmission condition, a second transmission condition, a first message, and a second message; a clock function unit configured to reference a current time; an input unit configured to receive input from a user; and a transmission unit configured to transmit the first message and second message stored in the storage unit to the transmission destination. The first message is transmitted by the transmission unit when the input time stored in the storage unit matches the current time indicated by the clock function unit, and when the first transmission condition is satisfied. The second message is transmitted by the transmission unit when the second transmission condition is satisfied. The communication device is set in an operating mode in at least one of the first transmission condition and the second transmission condition.

In accordance with another aspect of the invention, a communication device comprises a storage unit configured to store an inputted input time and prearranged transmission information including a transmission destination and a message; a clock function unit configured to reference a current time; an input unit configured to receive input from a user; a notification unit configured to provide notification to the user; a display unit configured to provide a display; and a transmission unit configured to transmit the message stored in the storage unit to the transmission destination. If the power of the communication device is switched off when the current time on the clock function unit is earlier than the input time in the storage unit, a display showing that the prearranged transmission information is stored in the storage unit is provided on the display unit.

In accordance with another aspect of the invention, a communication device comprises a schedule storing unit configured to store a plurality of schedules comprising a scheduled time and a schedule title; an address storing unit configured to store an address which corresponds to the schedule title stored in the schedule storing unit; a message storing unit configured to store a message; a clock function unit configured to reference a current time; an input unit configured to receive input from a user; a notification unit configured to provide notification to the user; a transmission unit configured to transmit the message stored in the message storing unit; a schedule editing and managing module configured to edit and manage the plurality of schedules stored in the schedule storing unit; and a display unit configured to display the plurality of schedules that are edited and managed by the schedule editing and managing module. A control unit is configured to perform automatic transmission setting control according to which a schedule is selected from the plurality of schedules displayed on the display unit, whereby notification is provided by the notification unit when the scheduled time stored in the schedule storing unit matches the current time indicated by the clock function unit. If no input is provided through the input unit within a predetermined length of time from the notification, the message is automatically transmitted by the transmission unit to the address stored in the address storing unit which corresponds to the schedule title.

In accordance with another aspect of the invention, a communication method comprises receiving an input time, a transmission destination, and a first message; providing notification when the input time and a current time match; not transmitting the first message when input indicating transmission cancellation is provided within a predetermined length of time from the notification; and transmitting the first message when no input indicating the transmission cancellation is provided within the predetermined length of time.

In accordance with another aspect of the invention, a program stored in a computer readable medium for facilitating communication via a communication device comprises code for receiving an input time, a transmission destination, and a first message; code for providing notification when the input time and a current time match; code for not transmitting the first message when input is received indicating transmission cancellation is provided within a predetermined length of time from the notification; and code for transmitting the first message when no input is received indicating the transmission cancellation is provided within the predetermined length of time.

BRIEF DESCRIPTION OF THE DRAWINGS

FIG. 5 is an example of a first electronic mail format;

FIG. 6 is an example of a second electronic mail format;

FIG. 10 is a view showing completed automatic transmission setting from a schedule list;

FIG. 11 is a view showing automatic transmission setting from a schedule register;

DETAILED DESCRIPTION OF THE INVENTION

Figure 1:
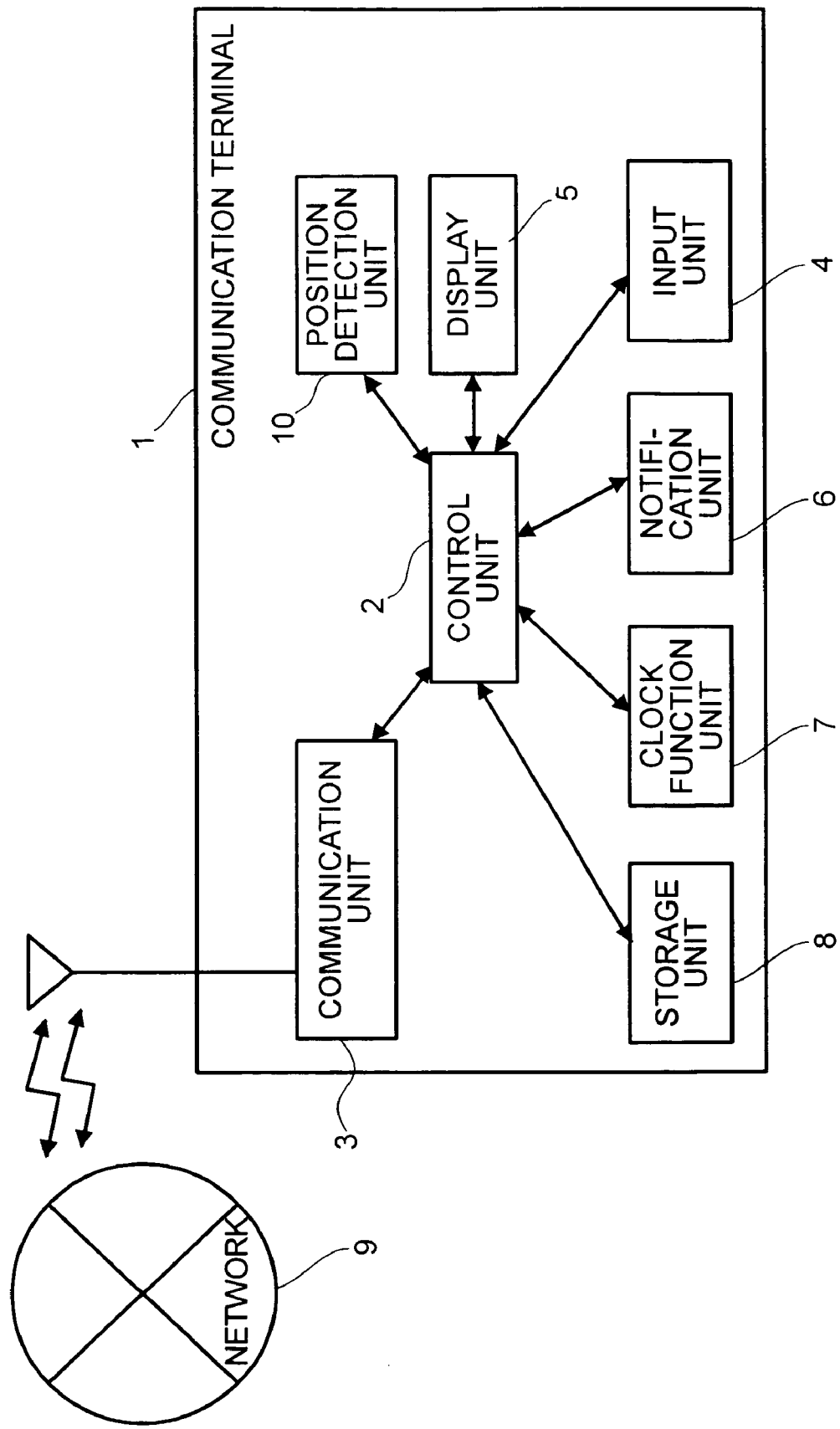
FIG. 1 is a functional block diagram showing one embodiment of the communication terminal.

An embodiment of the communication terminal according to the present invention will be described below with reference to the drawings. FIG. 1 is a functional block diagram showing an embodiment of the present invention. A communication terminal 1 shown in the drawing comprises a control unit 2, a communication unit 3, an input unit 4, a display unit 5, a notification unit 6, a clock function unit 7, and a storage unit 8.

First, the functions of each unit of the communication terminal 1 will be described. The control unit 2 controls the functions of each unit of the communication terminal 1. The communication unit 3 is controlled by the control unit 2 to perform wireless communication with a network 9. The input unit 4 is a keypad, for example, and is used by a user to input information to the control unit 2. The display unit 5 is a liquid crystal display, for example, and is controlled by the control unit 2 to display alphanumerical information, image information, and the like. The notification unit 6 is a speaker, for example, and is controlled by the control unit 2 to alert the user by sound or movement such as vibration. The clock function unit 7 is capable of referencing current time information from the control unit 2. The storage unit 8 is RAM, for example, and is capable of storing various information to be processed by the terminal control unit 2.

Next, an example in which a recorded communication destination is automatically informed that a meeting has been extended will be described with reference to FIGS. 2 through 7. A first transmission condition combined with a prearranged transmission time condition is that an alarm notifying the prearranged transmission time should not be halted. Also in this example, when the user first operates the terminal following execution of the prearranged transmission and assuming a second transmission condition is satisfied, an electronic mail indicating an indication of the length of a delay is transmitted automatically.

Figure 2:
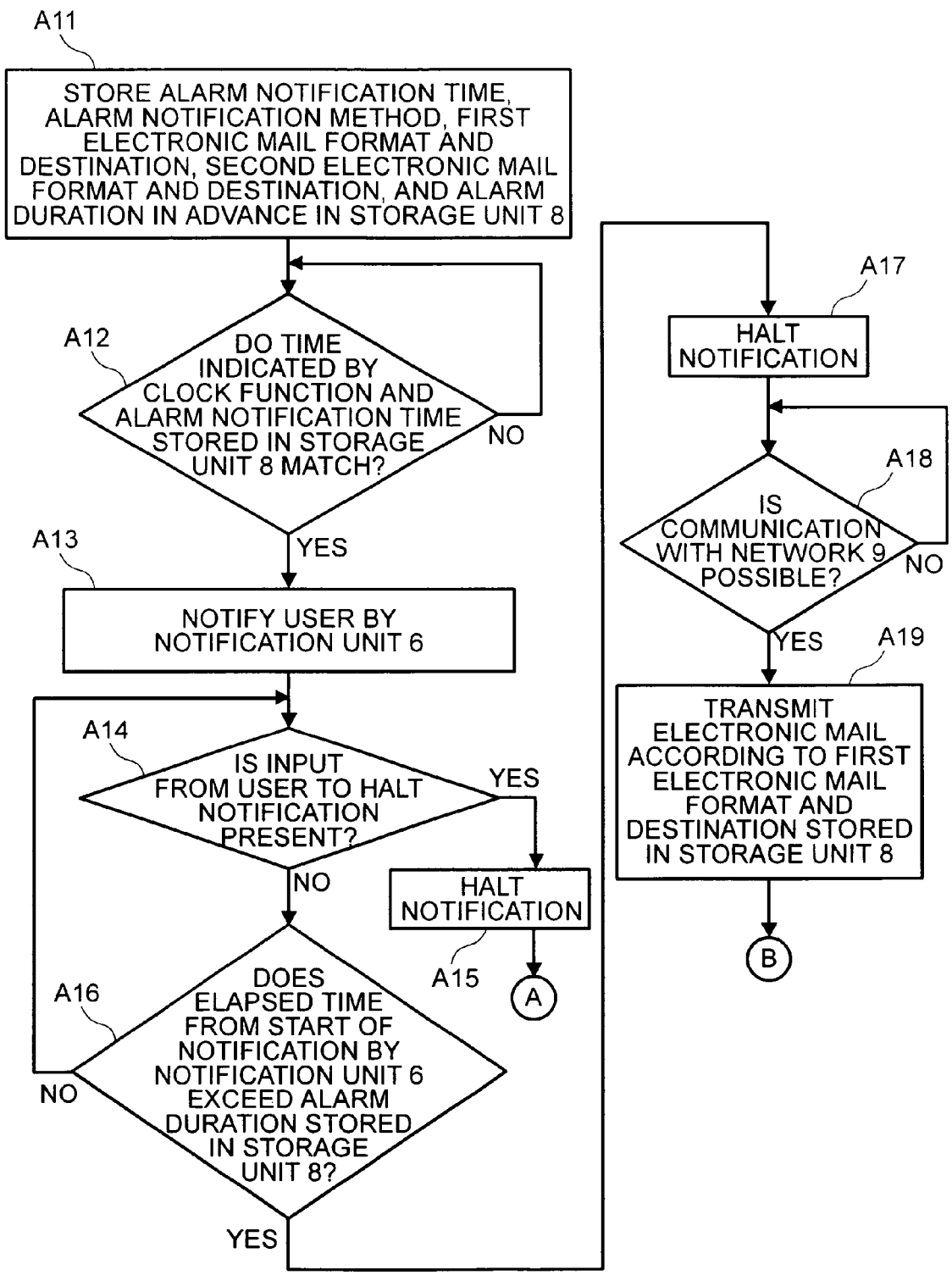
FIGS. 2 and 3 show a flowchart of a processing sequence in a communication terminal according to one embodiment of the invention.
Figure 3:
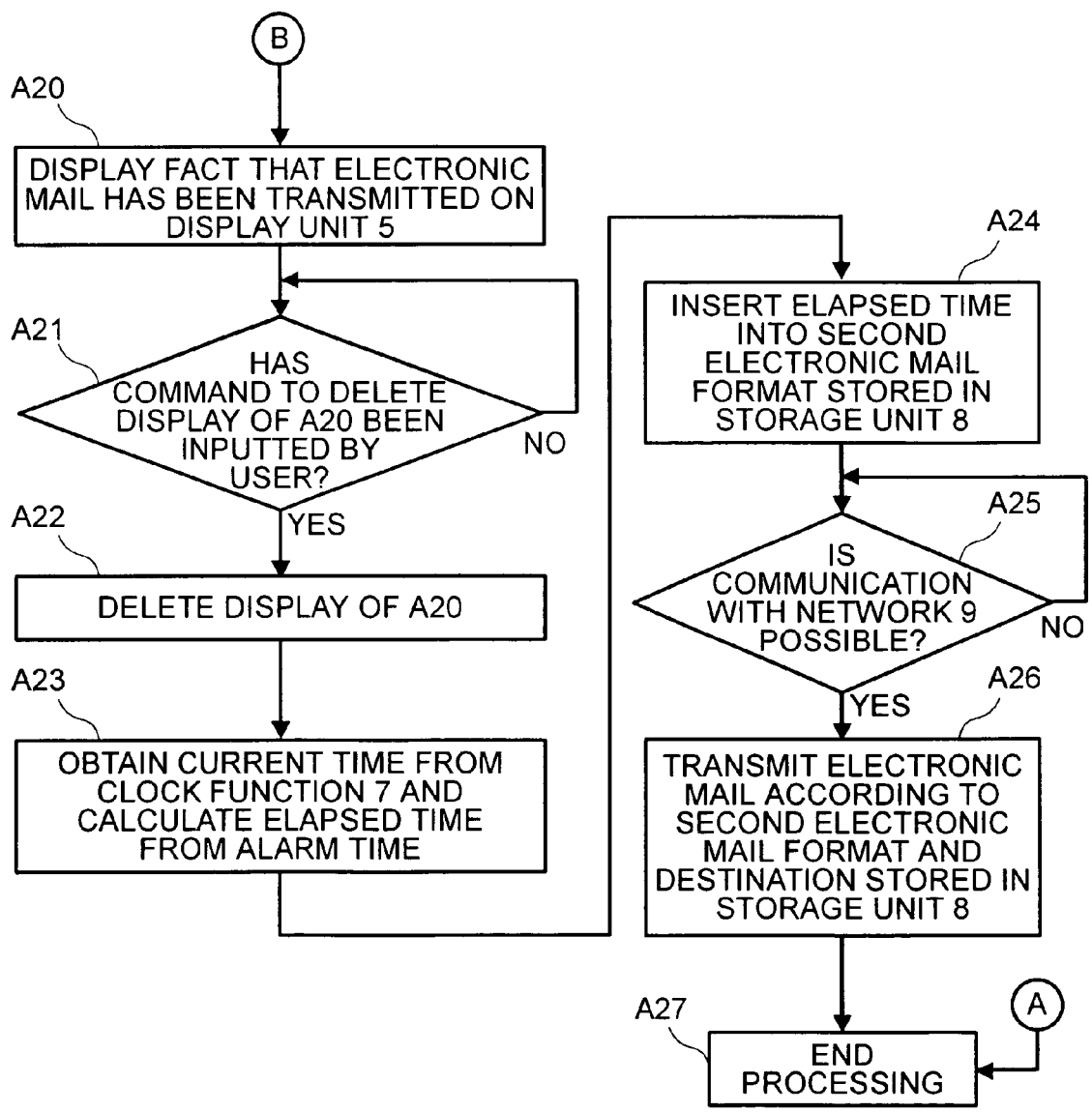
Figure 4:
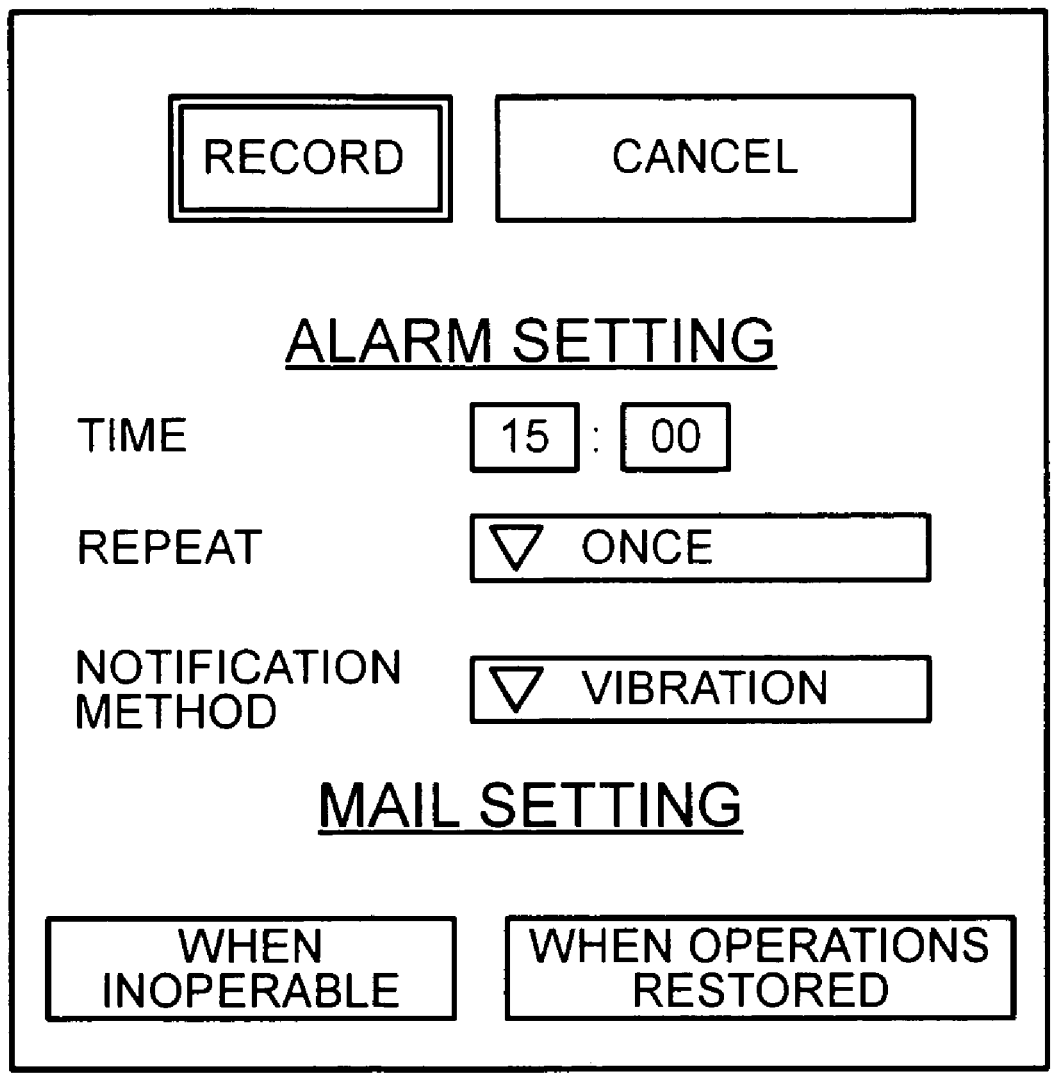
FIG. 4 is an example of an automatic transmission setting screen.

FIGS. 2 and 3 are flowcharts of processing executed by the control unit 2 in this operational example. The user uses the input unit 4 to input in advance an alarm notification time, an alarm notification method, a first electronic mail format and destination, a second electronic mail format and destination, and an alarm duration specifying an amount of time from the start of alarm notification to automatic cessation. FIG. 4 is an example of a setting screen. In this example, a setting screen for automatic transmission of the first and second electronic mail may be called up while setting the alarm notification time. FIG. 5 is an example of the electronic mail automatic transmission setting screen called up from the alarm setting screen in FIG. 4. In this example, the content of the automatically transmitted electronic mail can be saved and called up, enabling input labor-saving.

As shown in FIG. 5, for example, the first electronic mail format is for communicating a delay. The second electronic mail format is as shown in FIG. 6, for example, and includes a control code into which time information serving as an indication of the length of the delay can be inserted by the control unit. In this example, "$DELAY" in the drawing serves as the control code. The control unit possesses a function for inserting the time information serving as an indication of the length of the delay into the control code. When this setting information is inputted by the user, the control unit 2 stores the information in the storage unit 8 (step A11).

Next, the control unit 2 starts to monitor the clock function unit 7. When the alarm notification time stored in the storage unit 8 in step A11 matches the time indicated by the clock function unit 7 (YES in step A12), the control unit 2 informs the user of the match using the notification unit 6 in accordance with the alarm notification method stored in the storage unit (step A13). In this example, the user is in a meeting, and hence it is preferable that the alarm notification method be a vibration function. If audio notification does not disturb the surrounding areas, however, alarm notification may be performed by sound. If the user is able to see the terminal, notification may be performed by means of a display on the display unit 5 or by causing a light-emitting unit or fluorescent unit not shown in the drawing to light up or flash, thereby avoiding disturbance to the surrounding areas with certainty. In this case, the display unit 5, light-emitting unit or fluorescent unit functions as the notification unit 6. In this example, the notification method to be used is based on the set information stored in the storage unit 8 in advance, but this setting may be omitted and the method may be set on the terminal at that time. Note that alarm notification is halted if the user inputs something into the input unit 4.

When input which halts alarm notification is provided by the user during alarm notification (YES in step A14), it is determined that the user is able to operate the communication terminal freely, and thus that the meeting is over. Hence there is no need to communicate a delay, and in this case the control unit 2 causes the notification unit 6 to halt notification (step A15), whereby the series of processes ends (step A27).

If input which halts alarm notification is not provided by the user (NO in step A14), the amount of time elapsed from the beginning of notification is compared to the alarm duration stored in the storage unit 8 (step A16). If the former does not exceed the latter, the process returns to step A14 and input from the user is awaited (NO in step A16). If the elapsed time from the beginning of notification exceeds the alarm duration stored in the storage unit 8 (YES in step A16), it can be determined that the user is unable to halt alarm notification, and thus that the meeting has been extended and is still underway. In this case, the control unit 2 causes the notification unit 6 to halt notification (step A17) and checks whether the communication unit 3 is capable of communicating with the network 9 (step A18). If so (YES in step A18), the control unit 2 uses the communication unit 3 to transmit the first electronic mail format stored in the storage unit 8 to the first destination (step A19).

Thus the person to whom the first electronic mail format has been transmitted notified of the user's delay. Since the user may be informed when the prearranged transmission time and current time match, the processing load on the terminal can be lightened. Moreover, if the user inputs something during notification, message transmission is halted, and hence unnecessary message transmission when communication is possible can be halted.

The message receiver is able to learn the situation of the user before the user can operate the communication terminal, and thus a high level of user-friendliness is obtained. Moreover, prearranged transmission is canceled by the natural and simple operation of halting notification, and hence the possibility that the user will forget to cancel the prearranged transmission, causing mistaken transmission to be performed, can be eliminated.

If communication is impossible in step A18, step A18 is repeated at fixed time intervals while waiting for communication to become possible (NO in step A18), whereupon the process advances to step A19.

Figure 7:
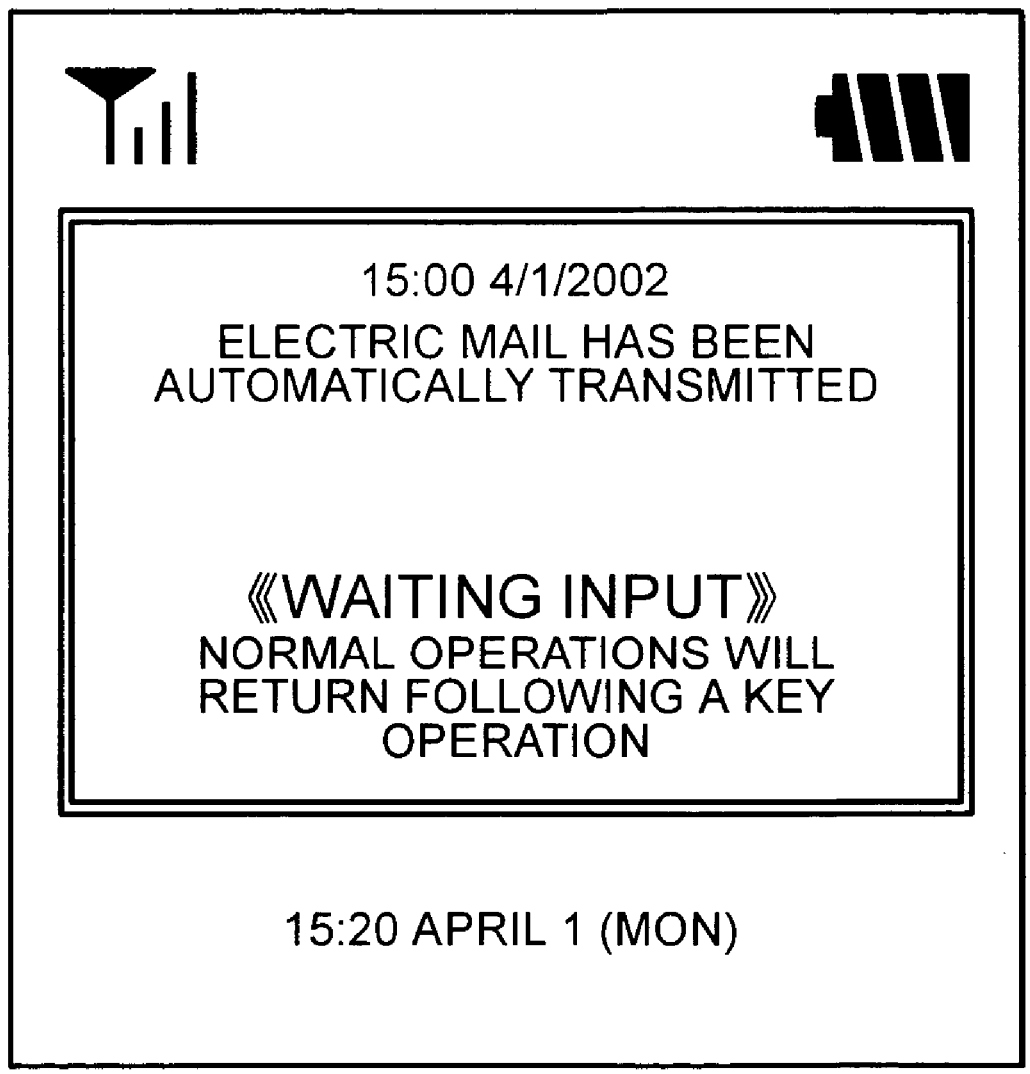
FIG. 7 is a display example of notification that automatic transmission is complete.

After the first electronic mail has been transmitted in step A19, the control unit 2 causes a display such as that shown in FIG. 7, for example, to be displayed on the display unit 5 to notify the user that automatic transmission is complete (step A20). This display continues to be displayed until the user inputs something into the input unit 4 (NO in step A21), and thus the user can confirm easily that automatic transmission has definitely been executed when the user first operates the terminal following automatic transmission. If input from the user is present, indicating that transmission has been confirmed (YES in step A21), the control unit 2 deletes the automatic transmission complete display on the display unit 5 (step A22). Here, the control unit 2 references the clock function unit 7 to obtain the current time, calculates the elapsed time from the alarm notification time stored in the storage unit 8 or the mail transmission time (step A23), and inserts this elapsed time into the control code portion of the second electronic mail format of FIG. 6 as an indication of the length of the delay from the scheduled time (step A24).

Next, the control unit 2 checks the state of communication between the communication unit 3 and the network 9 again, and if communication is possible (YES in step A25), the second electronic mail into which the delay was inserted in step A24 is transmitted to the second destination (step A26), whereby the series of processes ends (step A27). If communication with the network 9 is impossible (NO in step A25), the process waits for communication to become possible and then advances to step A26. By means of the second electronic mail, the receiver of the electronic mail can learn not only that the user has become capable of operating the communication terminal, but can also easily learn the length of time the user will be delayed. Thus more accurate correspondence is possible.

Note that in this example, time information serving as an indication of the length of the delay is transmitted in accordance with the setting of the second electronic mail, but the present invention is not limited thereto. If communication by the second electronic mail is unnecessary, for example, the setting of the second electronic mail and the steps A23 through A26 may be omitted.

Further, if something is inputted into the terminal in step A14, notification is halted and communication is considered possible. Depending upon the circumstances, however, a simple operation may be possible while communication is impossible. Hence provision may be made such that when specific input indicating transmission cancellation is provided, message transmission is halted, and in all other cases, only notification is halted and the message to be transmitted is sent. In so doing, inadvertent transmission cessation caused by a button being pressed while the terminal is in a bag, for example, can be prevented.

Figure 13:
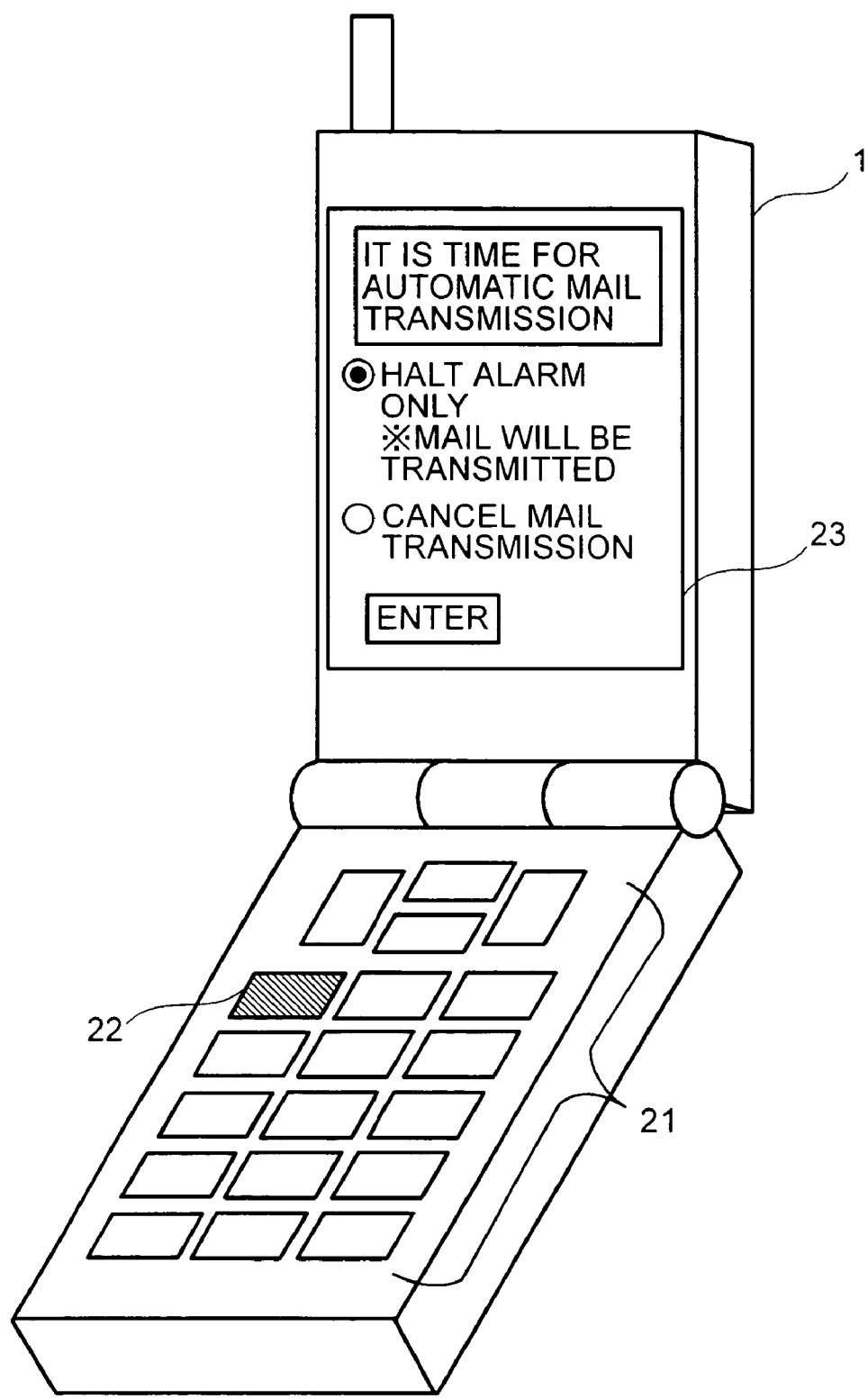
FIG. 13 is a view showing a communication device with cancellation function according to one embodiment.

In a specific embodiment as shown in FIG. 13, the communication terminal 1 includes keys 21, a cancellation key 22, and a display 23. When the notification time stored in the storage unit 8 matches the time indicated by the clock function unit 7, the control unit 2 informs the user of the match using the notification unit 6 in accordance with the alarm notification method stored in the storage unit 8. When it is possible for the user to operate freely, the user may press the specific cancellation key 22 to halt both notification and message transmission. On the other hand, if the user wants to halt notification only, the user may press any key 21 other than the cancellation key 22 to halt notification without stopping message transmission. Halting notification and message transmission selectively can be performed by pressing a key. This feature provides improved usability of the device. In other embodiments, halting notification and message transmission selectively may be achieved by selecting items displayed on the display 23 using the keys on the device. If the display has a touch-sensitive panel, the use can halt notification and message transmission by selectively touching the touch-sensitive panel. Of course, other ways of providing cancellation may be implemented.

Up to this point, description has focused on an example in which a meeting extension is communicated, but this function is also effective when the user uses the alarm as an alarm clock, for example. If the user does not notice the alarm and continues to sleep, the person with whom the user has an appointment can be informed immediately of the delay, even while the user sleeps. Having received the electronic mail, this person can take swift measures such as telephoning the user or altering arrangements, thereby easing the harm done by the delay.

As described below, alarm notification to the user may be performed at fixed intervals such that an electronic mail is transmitted to the first destination upon every alarm. First, an alarm notification interval specifying the interval at which alarm notification is to be repeated and an electronic mail format including a control code into which the alarm notification interval is inserted are stored in advance. In step A19, when the first electronic mail is to be transmitted, the alarm notification interval is inserted and the first electronic mail is transmitted. If the automatic transmission complete display is not deleted in step A21 (NO in step A21), the alarm notification time stored in the storage unit 8 is reset by the alarm notification interval and the process returns to step A12. Then, when the alarm is halted by the user or an operation to delete the automatic transmission complete display is inputted, the process advances to creation of the second electronic mail from step A22 onward. Note that the delay length inserted into the second electronic mail is calculated using the elapsed time from the first alarm notification time. Thus the user can be provided with a plurality of alarm notifications and electronic mails can be transmitted upon every notification. This is convenient in that the receiver of the electronic mail can learn the situation in more detail.

Further, by providing the communication terminal 1 with a position detection unit 10 constituted by GPS or the like, control may be performed by the control unit 2 such that information regarding the current position of the communication terminal 1 is obtained before the first and second electronic mails are transmitted and this position information is attached to each of the mails. For example, the communication terminal 1 of this example is given to a young child or an elderly person who is prone to wandering, and the destination of electronic mail automatic transmission is set as the family. If the carrier is unable to stop alarm notification, an electronic mail containing the current position information of the carrier is automatically transmitted to the family. By setting the terminal such that this operation is executed at fixed times, the family can check that the carrier is behaving normally on a regular basis. In this case also, if setting is performed such that prearranged transmission is performed repeatedly at fixed intervals, as in the example described above, position information can be obtained periodically even when the carrier moves after the communication terminal 1 becomes inoperative.

Moreover, if prearranged transmission is performed repeatedly, when the electronic mail including position information is to be transmitted, movement information such as the distance moved from the previously obtained position information, the direction of movement, the movement speed, and so on may be calculated and attached to the mail. By providing mechanisms or modules for calculating the difference between the previous and current information and thereby calculating the distance, movement direction, movement speed, and so on, the mail receiver can grasp the movement situation of the terminal carrier without making a comparison with the previous electronic mail, which is convenient. Note that in this example, position information is not transmitted when the carrier halts alarm notification, unlike a monitoring function that emits position information at all times, and thus the privacy of the carrier is protected at normal times.

By providing the communication terminal to a child or elderly person with a tendency to wander, about whose behavior concern may arise, the safety of the carrier can be checked by performing notification at fixed times. By attaching information regarding the position of the carrier to the transmitted information, information regarding the position at which an anomaly occurs can also be obtained. In this case also, prearranged transmission is canceled by the natural and simple operation of stopping the alarm which can be performed easily by a child or elderly person.

Up to this point, description has focused on an example in which the first transmission condition, combined with the prearranged transmission time, is the absence of alarm notification cessation by the user. However, the effectiveness of the present invention is not limited thereby, and the first transmission condition combined with the prearranged transmission time may be as follows, for example.

First, an example in which the first transmission condition is that a forecast arrival time is later than a planned arrival time will be described. In this example, the communication terminal is provided with a function for retrieving the current position, and the communication terminal or network is provided with a function for predicting the arrival time which is capable of obtaining a forecast arrival time at a destination from the current position, current time, and destination position. The arrival time predicting function may also be realized as a function which calculates the required time from a public transportation timetable database, considering all other sections as pedestrian, for example.

The user records the prearranged transmission time, mail destination, position of the destination such as a meeting place, and planned arrival time in advance. The prearranged transmission time may be set earlier than the planned arrival time, for example, such that the mail receiver is able to learn of a delay prior to the planned meeting time. When the prearranged transmission time is reached, the communication terminal first obtains current position information using the current position retrieval function, whereupon the arrival time predicting function is used to obtain a forecast arrival time at the destination from the current position, current time, and destination position. If the forecast arrival time is later than the pre-stored planned arrival time, the communication terminal transmits an electronic mail to the prearranged transmission destination. This electronic mail may include forecast arrival time information such that the electronic mail receiver can learn the length of the delay, thus enhancing convenience.

When the forecast arrival time is obtained in the example described above, the control unit may determine whether the user is in motion or still by obtaining the current position a plurality of times. If the user is not in motion, a message such as "not in motion" may be included in the transmitted electronic mail instead of a forecast arrival time, thereby preventing errors such as the transmission of a forecast arrival time from the current point in time despite the fact that a meeting or the like keeping the user in a stationary position is not yet finished.

A forecast arrival time may also be obtained repeatedly at fixed time intervals after the prearranged transmission time. In this case, an electronic mail can be transmitted at the point in time from which the planned arrival time will not be met, which is convenient in that the receiver can learn of the delay even sooner.

Next, an example in which the first transmission condition is that the communication terminal 1 is set to drive mode will be described. In this case, if the prearranged transmission time is set to the meeting time and the destination of electronic mail automatic transmission is set to the person to be met, the following effects are achieved. Here, drive mode is defined as a collection of a plurality of setting items used when the user is driving a car, and it is assumed that the communication terminal 1 possesses the drive mode as an operating mode. When the user is driving and has not yet reached the meeting place at the prearranged transmission time, the control unit 2 obtains current position information from the position detection unit 10, whereby an electronic mail including the position information and the fact that the user is driving is transmitted automatically to the person to be met. When the user has already alighted from the vehicle and canceled drive mode at the prearranged transmission time, the control unit 2 does not transmit the electronic mail. Hence if the user does not appear at the meeting time, the person to be met can learn the current position of the user and the fact that the user is currently driving, which is convenient. Drive mode may also be set automatically by the control unit according to the distance between the vehicle and the user using short-haul communication with the owned car. In this case, erroneous transmission when the user forgets to cancel drive mode can be prevented.

If prearranged transmission is set in advance, control may be performed by the control unit such that when an operation to cut power is performed by the user thereafter, the content of the prearranged transmission setting is displayed on the display unit. Control may also be performed by the control unit such that power is cut when the user performs an input operation following confirmation of this content. A location such as a hospital, for example, in which users voluntarily refrain from using portable terminals and thus switch off the power of the terminals may be considered. By means of the control described above, the user can learn the content of the prearranged transmission setting when performing a power-cutting operation, which is convenient. When the prearranged content is displayed, the user may also be notified of the prearranged content display by sound, vibration, display, illumination, or flashing. If sound or vibration is used, the user can be encouraged to check the prearranged content even if the user intends to switch off the power without looking at the display unit when the terminal is in a pocket, for example. Control may also be performed by the control unit such that if the prearranged transmission time passes while the power is off, a message to inform the user that the prearranged transmission time has passed or a message to encourage the user to transmit an electronic mail is displayed on the display unit when the power is switched back on. In so doing, the user can be caused to remember to take appropriate measures such as contacting the contact destination which was the subject of the prearranged transmission, for example. Control may also be performed by the control unit such that a selection such as "Send? Yes/No", for example, is displayed on an electronic mail transmission screen, and when the user selects "Yes", an electronic mail creation screen is displayed and an electronic mail of a pre-registered format is transmitted. In this case, the user can transmit an electronic mail simply by a key operation, which is convenient.

Further, a server having an electronic mail transmission function and a function for monitoring the power of the communication terminal may be provided on the network side and control may be performed by the control unit such that the communication terminal records the content of the prearranged transmission in the server when the power is cut. When the user provides input to cut the power, for example, the control unit transmits the set prearranged transmission time, destination, and electronic mail format to the server on the network side. If the power of the communication terminal is off at the received prearranged transmission time, the electronic mail is transmitted to the specified destination from the server instead of the terminal. In this case, prearranged transmission can be performed even when the power of the communication terminal is off.

Up to this point, examples have been described in which automatic transmission setting is performed for each transmitted mail. However, control may be performed such that automatic transmission setting is performed by means of an operation on a screen displaying a plurality of schedules which are edited and managed by a schedule editing and managing module. An example in which automatic transmission setting is performed in conjunction with the schedule editing and managing module will be described below with reference to FIGS. 8 through 10.

Figure 8:
FIG. 8 is a view showing automatic transmission setting from a schedule list.
Figure 9:
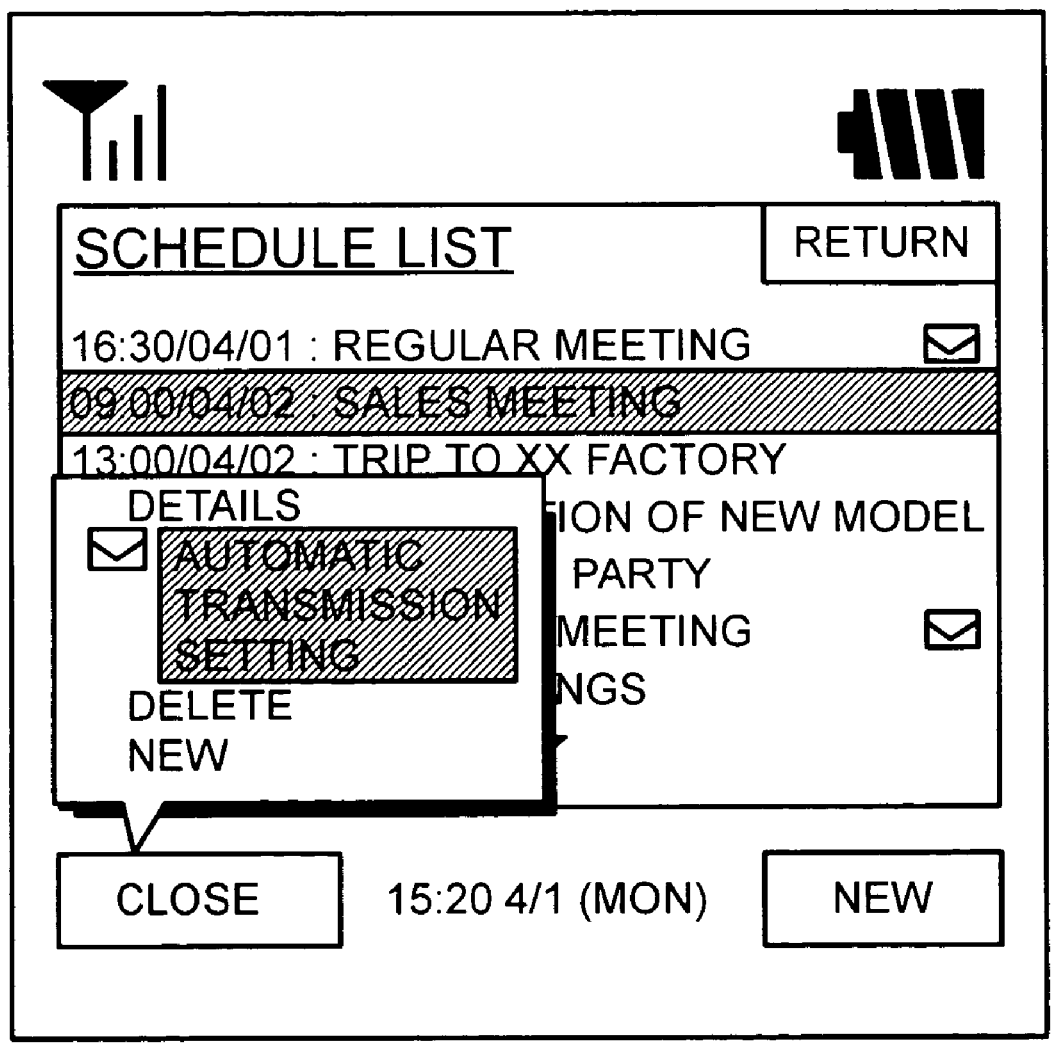
FIG. 9 is a view showing a sub-menu for the automatic transmission setting from a schedule list.

FIG. 8 is a screen displaying a list of a plurality of schedules which are edited and managed by the schedule editing and managing module. A schedule for which automatic transmission setting will be performed is specified from this schedule list. Here, a case in which automatic transmission setting is performed for the schedule entitled "sales meeting" and scheduled for 9:00, 04/02 will be described. First, as shown in FIG. 8, the schedule title to be selected "sales meeting" is selected. Then, for example, the user calls up a sub-menu displayed as "function" or the like, or presses a button corresponding to the call up of a sub-menu, whereby the control unit 2 displays a sub-menu such as that shown in FIG. 9, for example, on the display unit 5.

The sub-menu comprises an automatic transmission setting item, and when the user selects this item, the control unit 2 displays an automatic transmission setting screen such as that shown in FIG. 4, for example, on the display unit 5. In so doing, automatic transmission setting can be performed in conjunction with the schedule editing and managing module, thereby improving user-friendliness.

Here, if the member who is to take part in the schedule entitled "sales meeting" is fixed and an address corresponding to the member is stored in an address storage unit, a message may be transmitted to the corresponding address automatically. In this case, a message can be transmitted automatically to the address corresponding to "sales meeting" simply by inputting the schedule title "sales meeting" without the need to input the transmission destination every time, thereby improving user-friendliness.

Note that here, the address is stored in accordance with the schedule title, but the address may be stored in accordance with a person involved in the schedule. When managing the schedules, the name of the person involved in the schedule is sometimes inputted instead of the schedule title, and thus the user-friendliness of automatic transmission setting at this time can be improved.

If automatic transmission setting is attempted when an address corresponding to a schedule title or name of a person involved is not stored in the address storage unit, a request for specification of the transmission destination address may be displayed. In so doing, transmission errors occurring when no transmission destination address is set can be prevented.

Figure 10:
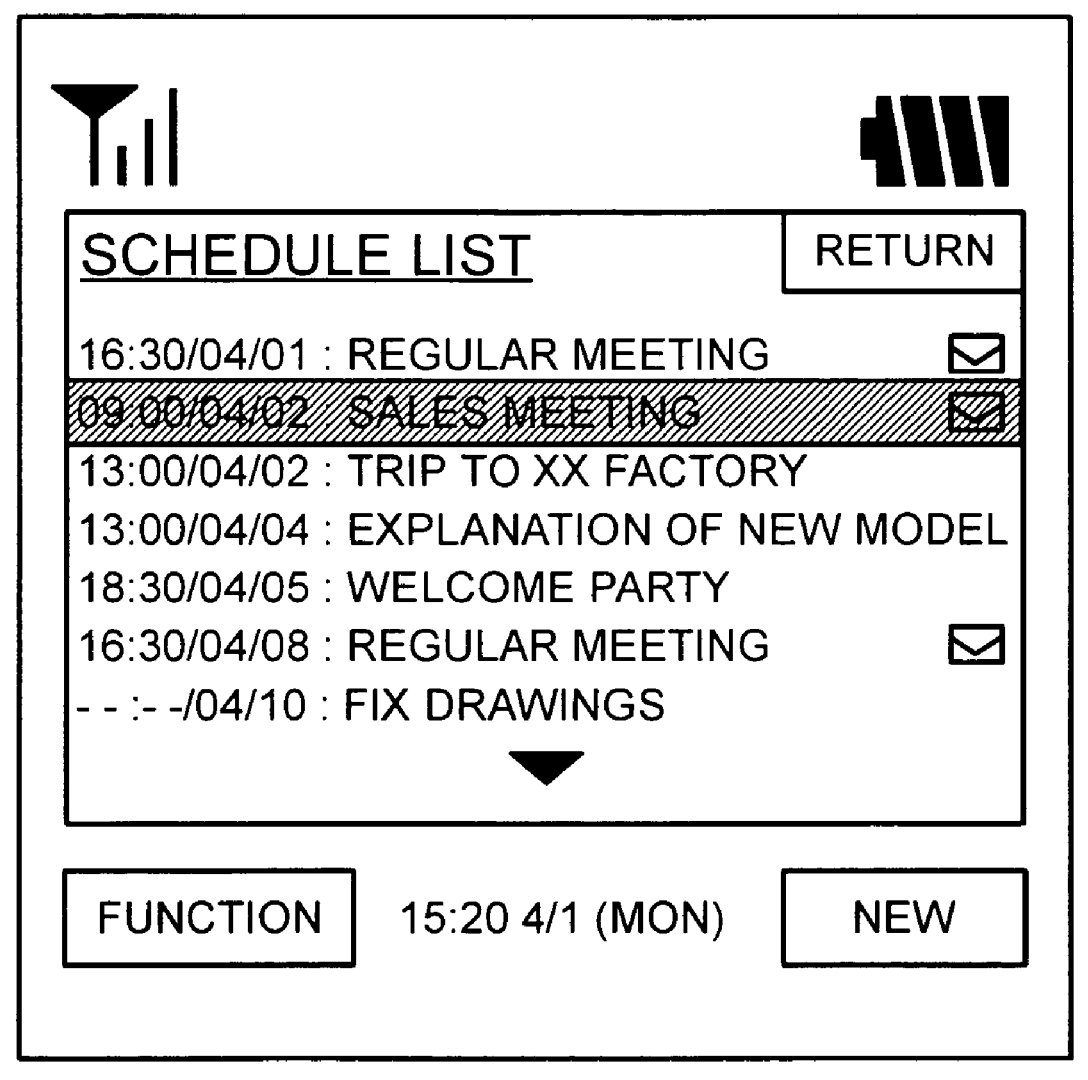

Further, when performing electronic mail automatic transmission setting, an icon indicating that electronic mail automatic transmission has been set may be displayed together with the schedule title "sales meeting," as shown in FIG. 10. This is convenient in that the user can easily notice that s/he has forgotten to perform setting or made a mistake in setting. Note that in FIGS. 8 through 10, automatic transmission has also been set for unselected schedule titles. This indicates that automatic transmission setting has already been performed.

If the user wishes to cancel transmission setting after automatic transmission setting has been performed, the following operation is performed. By selecting an automatic transmission setting cancellation menu (not shown) which is displayed by calling up a sub-menu displayed as "function" or the like, for example, transmission setting is canceled easily. Thus automatic transmission setting and cancellation can be performed easily, leading to an improvement in user-friendliness.

Figure 12:
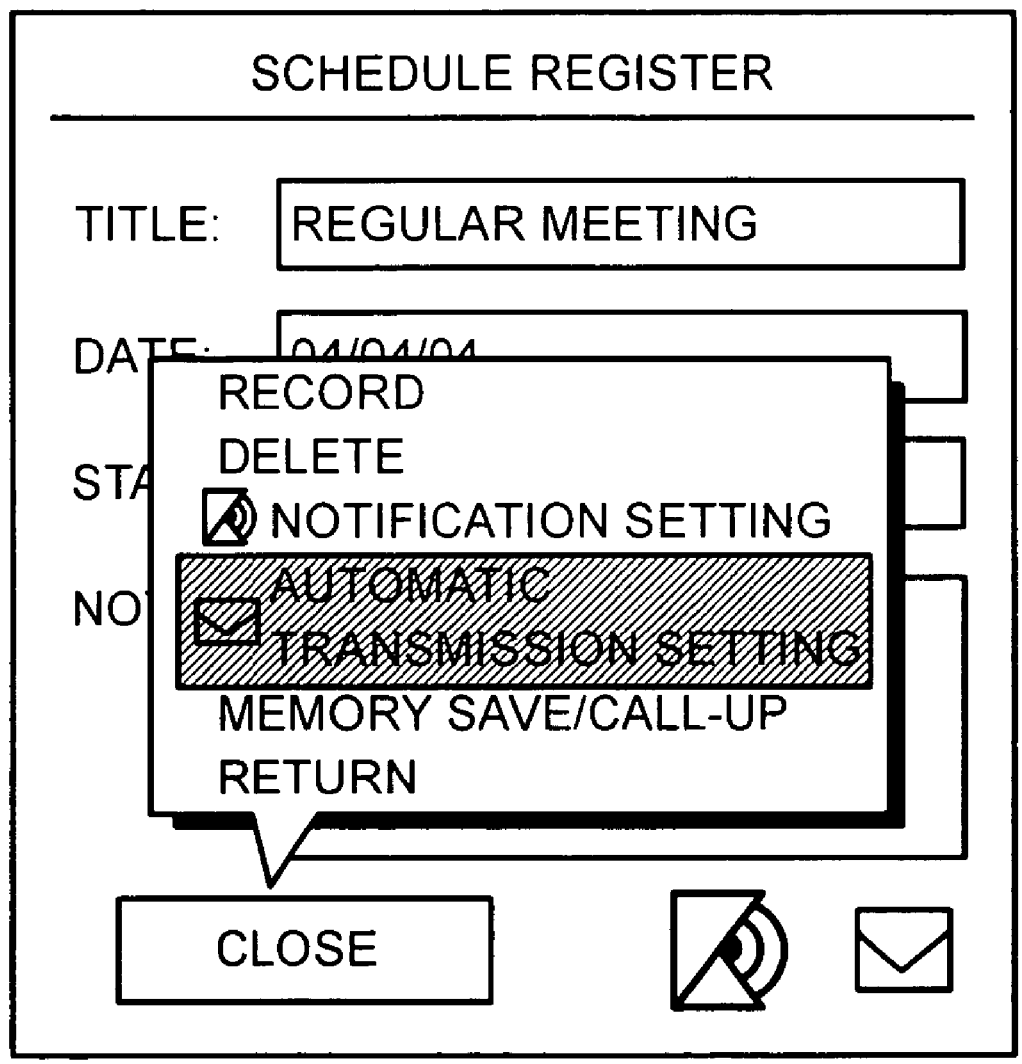
FIG. 12 is a view showing a sub-menu for the automatic transmission setting from a schedule register.

Automatic transmission setting may also be performed at the same time as a schedule is recorded. As shown in FIG. 11, for example, when the schedule "regular meeting" is recorded, the user calls up the sub-menu displayed as "function" or the like or presses a button corresponding to the call up of a sub-menu, whereby the control unit 2 displays a sub-menu such as that shown in FIG. 12, for example, on the display unit 5.

The sub-menu comprises an automatic transmission setting item, and when the user selects this item, the control unit 2 displays an automatic transmission setting screen such as that shown in FIG. 4, for example, on the display unit 5. In so doing, automatic transmission setting can be performed in conjunction with schedule recording, thereby improving user-friendliness.

Further, the schedule finish time that is opened when the automatic transmission setting screen is called up from the schedule register screen may be set as the initial value of the automatic transmission time. When the user wishes to perform automatic transmission at the schedule finish time, input labor is saved by using this function, thereby improving user-friendliness.

As for items such as a meeting, for example, which have predetermined automatic transmission conditions and communication destinations, control may be performed such that all of the meetings recorded in the scheduler may be set en bloc according to the same conditions, and settings which are used repeatedly in this manner may be recorded as a model and recalled later. In this case, the user can save the labor of inputting the same conditions many times, and hence usability can be improved.

Note that in this embodiment, information transmitted from the communication terminal 1 is in the form of an electronic mail, but the present invention is not limited by the format of the information, and this format may be a voice message, for example. If a voice message is used, input of the message content can be performed easily.

In this embodiment, notification is provided when the pre-arranged transmission time and the current time match, but notification may be provided at an arbitrary fixed time prior to the prearranged transmission time. In so doing, a message may be transmitted at a time which matches the prearranged transmission time.

The portable terminal described in this embodiment may also be obtained by downloading or inputting a program which causes a portable terminal to perform the operations described in the embodiment. In this case, the program need only be inputted and there is no need to buy a new portable terminal.

In order to further assist schedule notification to the user, the "prearranged transmission time" in the embodiment up to this point may be set as an "input time", assuming that the time of notification has been inputted. Also, the length of the notification time by the notification unit 6 may be set temporarily to a different length of time to the "predetermined length of time". As a result, the length of the notification time can be shortened so as to avoid disturbing people nearby, and the amount of time required to determine whether or not to transmit a message can be lengthened even when the length of the notification time remains as is.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A communication device comprising:
   a storage unit configured to store a scheduled time, a transmission destination, a first message, and a second message;
   a clock function unit configured to reference a current time;
   an input unit configured to receive input from a user;
   a notification unit configured to provide notification to the user;
   a transmission unit configured to transmit the first message stored in the storage unit to the transmission destination; and
   a control unit configured to control the notification unit to provide notification to the user when the scheduled time stored in the storage unit matches the current time indicated by the clock function unit, to control the transmission unit to transmit the first message when no input indicating transmission cancellation is provided through the input unit within a predetermined length of time from the notification, and to control the transmission unit to not transmit the first message when input indicating transmission cancellation is provided through the input unit within the predetermined length of time from the notification, wherein following the transmission of the first message by the transmission unit, the second message is transmitted by the transmission unit when input indicating confirmation of the transmission of the first message is provided through the input unit,
   wherein the control unit is further configured to calculate an elapsed time based on the scheduled time when the input indicating confirmation of the transmission of the first message is provided, and the elapsed time is transmitted with the second message.

2. The communication device according to claim 1, wherein the first message communicates a delay to the transmission destination, and the second message communicates a length of the delay to the transmission destination.

3. The communication device according to claim 2, further comprising a position detection unit configured to detect a position of the communication device, wherein position information related to the position of the communication device is transmitted with the first message or the second message.

4. The communication device according to claim 1, wherein the notification unit provides notification for the predetermined length of time.

5. The communication device according to claim 1, wherein the first message communicates a delay to the transmission destination.

6. A communication device comprising:
   a storage unit configured to store an input time, a transmission destination, and a first message;
   a clock function unit configured to reference a current time;
   an input unit configured to receive input from a user;
   a notification unit configured to provide notification to the user;
   a transmission unit configured to transmit the first message stored in the storage unit to the transmission destination;
   a control unit configured to control the notification unit to provide notification to the user when the input time stored in the storage unit matches the current time indicated by the clock function unit, to control the transmission unit to transmit the first message when no input indicating transmission cancellation is provided through the input unit within a predetermined length of time from the notification, and to control the transmission unit to not transmit the first message when input indicating transmission cancellation is provided through the input unit within the predetermined length of time from the notification, wherein following the transmission of the first message by the transmission unit, a second message is transmitted by the transmission unit when input indicating confirmation of the transmission of the first message is provided through the input unit; and a position detection unit configured to detect a position of the communication device; wherein the first message includes position information expressing the position detected by the position detection unit at a time of the first message; and wherein the second message includes position information expressing the position detected by the position detection unit at a time of the second message, wherein the first message communicates a delay to the transmission destination, and the second message communicates a length of the delay to the transmission destination.

7. The communication device according to claim 6, wherein the second message includes movement information of the communication device which is calculated based on the position information included in the first message and the position information included in the second message.

8. A communication method comprising:

receiving an input time, a transmission destination, and a first message;

providing notification when the input time and a current time match;

not transmitting the first message when input indicating transmission cancellation is provided within a predetermined length of time from the notification;

transmitting the first message when no input indicating the transmission cancellation is provided within the predetermined length of time;

transmitting a second message when input indicating confirmation of the transmission of the first message is received; and detecting a position of the communication terminal; wherein the first message includes position information expressing the position detected by the position detection unit at a time of the first message; and wherein the second message includes position information expressing the position detected by the position detection unit at a time of the second message.

9. A computer readable program encoded on a computer readable medium for facilitating communication via a communication device, the program comprising:

code for receiving an input time, a transmission destination, and a first message;

code for providing notification when the input time and a current time match;

code for not transmitting the first message when input is received indicating transmission cancellation is provided within a predetermined length of time from the notification;

code for transmitting the first message when no input is received indicating the transmission cancellation is provided within the predetermined length of time;

code for transmitting a second message when input indicating confirmation of the transmission of the first message is received; and code for providing with the first message position information expressing a first position of the communication device detected at a time of the first message, and for providing with the second message position information expressing a second position of the communication device detected at a time of the second message.

10. A communication device comprising:

a storage unit configured to store an input time, a transmission destination, a first transmission condition, a second transmission condition, a first message, and a second message;

a clock function unit configured to reference a current time;

an input unit configured to receive input from a user; and a transmission unit configured to transmit the first message and second message stored in the storage unit to the transmission destination, wherein the first message is transmitted by the transmission unit when the input time stored in the storage unit matches the current time indicated by the clock function unit, and when the first transmission condition is satisfied, wherein the second message is transmitted by the transmission unit when the second transmission condition is satisfied, wherein the communication device is set in an operating mode in at least one of the first transmission condition and the second transmission condition, wherein the first transmission condition is satisfied when the communication device is set in a first operating mode and the second operating mode; and wherein at least one of the first operating mode and the second operating mode is a drive mode.

11. A communication device for communication via a network, comprising:

a storage unit configured to store an inputted input time and prearranged transmission information including a transmission destination and a message;

a clock function unit configured to reference a current time;

an input unit configured to receive input from a user;

a notification unit configured to provide notification to the user;

a display unit configured to provide a display; and a transmission unit configured to transmit the message stored in the storage unit to the transmission destination, wherein, if the power of the communication device is switched off when the current time on the clock function unit is earlier than the input time in the storage unit, a display showing that the prearranged transmission information is stored in the storage unit is provided on the display unit, wherein, if the current time on the clock function unit is later than the input time when the power of the communication device is switched back on after being switched off, a display showing that the input time has been exceeded is provided on the display unit.

12. A communication device comprising:

a storage unit configured to store a scheduled time, a transmission destination, a first message, and a second message;

a clock function unit configured to reference a current time;

an input unit configured to receive input from a user;

a notification unit configured to provide notification to the user;

a transmission unit configured to transmit the first message stored in the storage unit to the transmission destination; and a control unit configured to control the notification unit to provide notification to the user when the scheduled time stored in the storage unit matches the current time indicated by the clock function unit, to control the transmission unit to transmit the first message when input is not provided by the user through the input unit within a predetermined length of time from the notification, and to control the transmission unit not to transmit the first message when input is provided by the user through the input unit within the predetermined length of time from the notification, wherein the second message is transmitted by the transmission unit when input is provided through the input unit after the transmission of the first message by the transmission unit, wherein the control unit is further configured to calculate an elapsed time based on the scheduled time when the input indicating confirmation of the transmission of the first message is provided, and the elapsed time is transmitted with the second message.

13. The communication device according to claim 12, wherein the first message communicates a delay to the transmission destination.

* * * * *